(12) United States Patent
Ha et al.

(10) Patent No.: US 12,427,854 B2
(45) Date of Patent: Sep. 30, 2025

(54) HYBRID VEHICLE INCLUDING ACTIVE AIR FLAP

(71) Applicants: Hyundai Motor Company, Seoul (KR); Kia Corporation, Seoul (KR)

(72) Inventors: Dong-Su Ha, Hwaseong-Si (KR); Janghyo Lee, Hwaseong-Si (KR); Jongwha Kim, Hwaseong-Si (KR); Mingi Jeong, Seoul (KR); Dong Jun Shin, Hwaseong-Si (KR); Tae Hyeong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 415 days.

(21) Appl. No.: 17/873,998

(22) Filed: Jul. 26, 2022

(65) Prior Publication Data

US 2023/0081948 A1    Mar. 16, 2023

(30) Foreign Application Priority Data

Sep. 10, 2021  (KR) .......................... 10-2021-0120823

(51) Int. Cl.
  *B60K 11/08*    (2006.01)
(52) U.S. Cl.
  CPC .................................. *B60K 11/085* (2013.01)
(58) Field of Classification Search
  CPC .............................. B60K 11/085; Y02T 10/88
  See application file for complete search history.

(56) References Cited

U.S. PATENT DOCUMENTS

| | | | | |
|---|---|---|---|---|
| 4,489,680 A | * | 12/1984 | Spokas | F01P 7/12 123/41.1 |
| 8,561,738 B2 | | 10/2013 | Charnesky et al. | |
| 9,670,824 B2 | * | 6/2017 | Sowards | F01P 7/12 |
| 9,950,612 B2 | * | 4/2018 | Miller | F01P 7/12 |
| 2006/0095178 A1 | * | 5/2006 | Guilfoyle | B60K 11/085 701/1 |
| 2011/0281515 A1 | * | 11/2011 | Lockwood | F01P 7/12 165/104.34 |
| 2013/0046445 A1 | * | 2/2013 | Nishimura | B60K 11/085 701/49 |

(Continued)

FOREIGN PATENT DOCUMENTS

EP    2233343 A2    9/2010

*Primary Examiner* — Kurt Philip Liethen
(74) *Attorney, Agent, or Firm* — Morgan, Lewis & Bockius LLP

(57) ABSTRACT

A hybrid vehicle includes active air flaps provided on a front-end module and a controller that controls the active air flaps based on a coolant temperature according to an outdoor air temperature, an inverter temperature of a drive motor according to an outdoor air temperature, an inverter temperature of an starter-generator according to an outdoor air temperature, a temperature of a low DC converter according to an outdoor air temperature, a transmission oil temperature according to an outdoor air temperature, or an engine oil temperature according to an outdoor air temperature, controls the active air flaps based on a refrigerant pressure according to an outdoor air temperature, controls the active air flaps based on an operation mode of a cooling fan, or controls the active air flaps based on an intake temperature according to an outdoor air temperature for each of driving modes of the vehicle.

3 Claims, 13 Drawing Sheets

(56) References Cited

U.S. PATENT DOCUMENTS

| | | | |
|---|---|---|---|
| 2014/0251239 A1* | 9/2014 | Richards | F02B 29/0493 |
| | | | 123/41.05 |
| 2015/0158377 A1* | 6/2015 | Dudar | B60K 11/085 |
| | | | 903/904 |
| 2016/0222867 A1* | 8/2016 | Lee | B60K 11/085 |
| 2017/0082092 A1* | 3/2017 | Gaither | F16D 65/847 |
| 2017/0151866 A1* | 6/2017 | Choi | B60K 11/085 |
| 2017/0321593 A1* | 11/2017 | Wolff | B60K 11/085 |
| 2019/0135084 A1* | 5/2019 | Sato | F01P 3/18 |

* cited by examiner

FIG. 5

| Outdoor air temperature (℃) | X-40 | X-30 | X-20 | X-10 | X | X+10 | X+20 | X+30 | X+40 | X+50 |
|---|---|---|---|---|---|---|---|---|---|---|
| First flap opening temperature (Coolant temperature) | A+4 | A+3 | A+2 | A+1 | A | A-1 | A-2 | A-3 | A-4 | A-5 |
| Second flap opening temperature (Coolant temperature) | A'+4 | A'+3 | A'+2 | A'+1 | A' | A'-1 | A'-2 | A'-3 | A'-4 | A'-5 |
| First flap closing temperature (Coolant temperature) | A''+4 | A''+3 | A''+2 | A''+1 | A'' | A''-1 | A''-2 | A''-3 | A''-4 | A''-5 |
| Second flap closing temperature (Coolant temperature) | A'''+4 | A'''+3 | A'''+2 | A'''+1 | A''' | A'''-1 | A'''-2 | A'''-3 | A'''-4 | A'''-5 |

FIG. 6

| Outdoor air temperature (℃) | X-40 | X-30 | X-20 | X-10 | X | X+10 | X+20 | X+30 | X+40 | X+50 |
|---|---|---|---|---|---|---|---|---|---|---|
| First flap opening temperature (First inverter temperature) | A+4 | A+3 | A+2 | A+1 | A | A-1 | A-2 | A-3 | A-4 | A-5 |
| Second flap opening temperature (First inverter temperature) | A'+4 | A'+3 | A'+2 | A'+1 | A' | A'-1 | A'-2 | A'-3 | A'-4 | A'-5 |
| First flap closing temperature (First inverter temperature) | A''+4 | A''+3 | A''+2 | A''+1 | A'' | A''-1 | A''-2 | A''-3 | A''-4 | A''-5 |
| Second flap closing temperature (First inverter temperature) | A'''+4 | A'''+3 | A'''+2 | A'''+1 | A''' | A'''-1 | A'''-2 | A'''-3 | A'''-4 | A'''-5 |

FIG. 7

| Outdoor air temperature (℃) | X-40 | X-30 | X-20 | X-10 | X | X+10 | X+20 | X+30 | X+40 | X+50 |
|---|---|---|---|---|---|---|---|---|---|---|
| First flap opening temperature (Second inverter temperature) | A+4 | A+3 | A+2 | A+1 | A | A-1 | A-2 | A-3 | A-4 | A-5 |
| Second flap opening temperature (Second inverter temperature) | A'+4 | A'+3 | A'+2 | A'+1 | A' | A'-1 | A'-2 | A'-3 | A'-4 | A'-5 |
| First flap closing temperature (Second inverter temperature) | A''+4 | A''+3 | A''+2 | A''+1 | A'' | A''-1 | A''-2 | A''-3 | A''-4 | A''-5 |
| Second flap closing temperature (Second inverter temperature) | A'''+4 | A'''+3 | A'''+2 | A'''+1 | A''' | A'''-1 | A'''-2 | A'''-3 | A'''-4 | A'''-5 |

FIG. 8

| Outdoor air temperature (°C) | X-40 | X-30 | X-20 | X-10 | X | X+10 | X+20 | X+30 | X+40 | X+50 |
|---|---|---|---|---|---|---|---|---|---|---|
| First flap opening temperature (Low DC converter temperature) | A+4 | A+3 | A+2 | A+1 | A | A-1 | A-2 | A-3 | A-4 | A-5 |
| Second flap opening temperature (Low DC converter temperature) | A'+4 | A'+3 | A'+2 | A'+1 | A' | A'-1 | A'-2 | A'-3 | A'-4 | A'-5 |
| First flap closing temperature (Low DC converter temperature) | A"+4 | A"+3 | A"+2 | A"+1 | A" | A"-1 | A"-2 | A"-3 | A"-4 | A"-5 |
| Second flap closing temperature (Low DC converter temperature) | A'''+4 | A'''+3 | A'''+2 | A'''+1 | A''' | A'''-1 | A'''-2 | A'''-3 | A'''-4 | A'''-5 |

| Outdoor air temperature (°C) | Outdoor air temperature (°C) |
|---|---|
| First flap opening temperature (Coolant temperature) | First flap opening temperature (First inverter temperature) |
| Second flap opening temperature (Coolant temperature) | Second flap opening temperature (First inverter temperature) |
| First flap closing temperature (Coolant temperature) | First flap closing temperature (First inverter temperature) |
| Second flap closing temperature (Coolant temperature) | Second flap closing temperature (First inverter temperature) |

FIG. 9

| Outdoor air temperature (℃) | X-40 | X-30 | X-20 | X-10 | X | X+10 | X+20 | X+30 | X+40 | X+50 |
|---|---|---|---|---|---|---|---|---|---|---|
| First flap opening temperature (Transmission oil temperature) | A+4 | A+3 | A+2 | A+1 | A | A-1 | A-2 | A-3 | A-4 | A-5 |
| Second flap opening temperature (Transmission oil temperature) | A'+4 | A'+3 | A'+2 | A'+1 | A' | A'-1 | A'-2 | A'-3 | A'-4 | A'-5 |
| First flap closing temperature (Transmission oil temperature) | A"+4 | A"+3 | A"+2 | A"+1 | A" | A"-1 | A"-2 | A"-3 | A"-4 | A"-5 |
| Second flap closing temperature (Transmission oil temperature) | A'''+4 | A'''+3 | A'''+2 | A'''+1 | A''' | A'''-1 | A'''-2 | A'''-3 | A'''-4 | A'''-5 |

FIG. 10

| Outdoor air temperature (℃) | X-40 | X-30 | X-20 | X-10 | X | X+10 | X+20 | X+30 | X+40 | X+50 |
|---|---|---|---|---|---|---|---|---|---|---|
| First flap opening temperature (Engine oil temperature) | A+4 | A+3 | A+2 | A+1 | A | A-1 | A-2 | A-3 | A-4 | A-5 |
| Second flap opening temperature (Engine oil temperature) | A'+4 | A'+3 | A'+2 | A'+1 | A' | A'-1 | A'-2 | A'-3 | A'-4 | A'-5 |
| First flap closing temperature (Engine oil temperature) | A''+4 | A''+3 | A''+2 | A''+1 | A'' | A''-1 | A''-2 | A''-3 | A''-4 | A''-5 |
| Second flap closing temperature (Engine oil temperature) | A'''+4 | A'''+3 | A'''+2 | A'''+1 | A''' | A'''-1 | A'''-2 | A'''-3 | A'''-4 | A'''-5 |

FIG. 11

| Outdoor air temperature (°C) | X-40 | X-30 | X-20 | X-10 | X | X+10 | X+20 | X+30 | X+40 | X+50 |
|---|---|---|---|---|---|---|---|---|---|---|
| First flap opening temperature (Refrigerant pressure) | B+4 | B+3 | B+2 | B+1 | B | B-1 | B-2 | B-3 | B-4 | B-5 |
| Second flap opening temperature (Refrigerant pressure) | B'+4 | B'+3 | B'+2 | B'+1 | B' | B'-1 | B'-2 | B'-3 | B'-4 | B'-5 |
| First flap closing temperature (Refrigerant pressure) | B''+4 | B''+3 | B''+2 | B''+1 | B'' | B''-1 | B''-2 | B''-3 | B''-4 | B''-5 |
| Second flap closing temperature (Refrigerant pressure) | B'''+4 | B'''+3 | B'''+2 | B'''+1 | B''' | B'''-1 | B'''-2 | B'''-3 | B'''-4 | B'''-5 |

FIG. 12

| Outdoor air temperature (℃) | X-40 | X-30 | X-20 | X-10 | X | X+10 | X+20 | X+30 | X+40 | X+50 |
|---|---|---|---|---|---|---|---|---|---|---|
| First flap opening temperature (Second inverter temperature) | B | B | B | B | B | B-1 | B-2 | B-3 | B-4 | B-5 |
| Second flap opening temperature (Second inverter temperature) | B' | B' | B' | B' | B' | B'-1 | B'-2 | B'-3 | B'-4 | B'-5 |
| First flap closing temperature (Second inverter temperature) | B'' | B'' | B'' | B'' | B'' | B''-1 | B''-2 | B''-3 | B''-4 | B''-5 |
| Second flap closing temperature (Second inverter temperature) | B''' | B''' | B''' | B''' | B''' | B'''-1 | B'''-2 | B'''-3 | B'''-4 | B'''-5 |

FIG. 13

|  |  | X-40 | X-30 | X-20 | X-10 | X | X+10 | X+20 | X+30 | X+40 | X+50 |
|---|---|---|---|---|---|---|---|---|---|---|---|
| First flap opening temperature (Intake temperature) | HEV mode | C | C | C | C | C | C | C | C-1 | C-1 | C-1 |
|  | EV mode | D | D | D | D | D | D | D | D-1 | D-1 | D-1 |
| Second flap opening temperature (Intake temperature) | HEV mode | E | E | E | E | E | E | E | E-1 | E-1 | E-1 |
|  | EV mode | F | F | F | F | F | F | F | F-1 | F-1 | F-1 |
| First flap closing temperature (Intake temperature) | HEV mode | G-2 | G-2 | G-2 | G-2 | G | G | G | G-1 | G-1 | G-1 |
|  | EV mode | H-2 | H-2 | H-2 | H-2 | H | H | H | H-1 | H-1 | H-1 |
| Second flap closing temperature (Intake temperature) | HEV mode | I-2 | I-2 | I-2 | I-2 | I | I | I | I-1 | I-1 | I-1 |
|  | EV mode | J-2 | J-2 | J-2 | J-2 | J | J | J | J-1 | J-1 | J-1 |

HYBRID VEHICLE INCLUDING ACTIVE AIR FLAP

CROSS-REFERENCE TO RELATED APPLICATION

The present application claims priority to Korean Patent Application No. 10-2021-0120823 filed on Sep. 10, 2021, the entire contents of which is incorporated herein for all purposes by this reference.

BACKGROUND OF THE PRESENT DISCLOSURE

Field of the Present Disclosure

The present invention relates to a hybrid vehicle including an active air flap. More particularly, the present invention relates to a hybrid vehicle including an active air flap capable of improving fuel efficiency through control of the active air flap according to a heat load of the hybrid vehicle.

Description of Related Art

In general, in an engine compartment of a hybrid vehicle, various heat exchangers such as a radiator, an intercooler, an evaporator, and a condenser are provided as well as parts for driving a hybrid vehicle such as an engine.

A heat-exchanging medium such as a refrigerant flows in the components to be heat-exchanged with ambient air of the heat exchangers to perform cooling or heat dissipation.

Thus, to stably operate the variety of heat exchangers within the engine compartment of a vehicle, ambient air is required to be smoothly supplied to the engine compartment.

However, when a vehicle is running at a high speed, a large amount of ambient air is introduced, increasing air resistance. Thus, vehicle fuel efficiency (or mileage) is degraded.

To address the problem, an active air flap system is used to make a large amount of air flow to the interior of an engine compartment when a hybrid vehicle is running at a low speed and make a relatively small amount of air flow to the interior of the engine compartment when the vehicle is running at a high speed, to thus enhance fuel efficiency.

The conventional active air flap reduces air resistance of the hybrid vehicle and improves driving stability by closing the flap during high-speed driving, and lowers the temperature inside the engine compartment by opening the flap when the temperature inside the engine compartment rises.

However, research to improve the fuel efficiency according to the internal heat load (e.g., a heat load generated by the engine, the cooling module, and the drive motor) inside the hybrid vehicle is insufficient.

The information included in this Background of the present disclosure section is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing a hybrid vehicle including an active air flap configured for improving fuel efficiency that deteriorates due to the heat load inside the hybrid vehicle and a control method thereof.

A hybrid vehicle including an active air flap includes: a plurality of active air flaps provided on a front-end module of the hybrid vehicle; and a controller that controls opening and closing of the plurality of active air flaps based on a coolant temperature according to an outdoor air temperature, an inverter temperature of a drive motor according to the outdoor air temperature, an inverter temperature of a starter-generator according to the outdoor air temperature, a temperature of a low DC converter according to the outdoor air temperature, a transmission oil temperature according to the outdoor air temperature, or an engine oil temperature according to the outdoor air temperature, controls opening and closing of the plurality of active air flaps based on a refrigerant pressure according to the outdoor air temperature, controls opening and closing of the plurality of active air flaps based on an operation mode of a cooling fan, or controls opening and closing of the plurality of active air flaps based on an intake temperature according to the outdoor air temperature for each of driving modes of the vehicle.

The controller is configured to open one active air flap among the plurality of active air flaps when the coolant temperature according to the outdoor air temperature, the inverter temperature of the drive motor according to the outdoor air temperature, the inverter temperature of the starter-generator according to the outdoor air temperature, the temperature of the low DC converter according to the outdoor air temperature, the transmission oil temperature according to the outdoor air temperature, or the engine oil temperature according to the outdoor air temperature reaches a first flap opening temperature, opens another active air flap among the plurality of active air flaps when the coolant temperature according to the outdoor air temperature, the inverter temperature of the drive motor according to the outdoor air temperature, the inverter temperature of the starter-generator according to the outdoor air temperature, the temperature of the low DC converter according to the outdoor air temperature, the transmission oil temperature according to the outdoor air temperature, or the engine oil temperature according to the outdoor air temperature reaches a second flap opening temperature, blocks one active air flap among the plurality of active air flaps when the coolant temperature according to the outdoor air temperature, the inverter temperature of the drive motor according to the outdoor air temperature, the inverter temperature of the starter-generator according to the outdoor air temperature, the temperature of the low DC converter according to the outdoor air temperature, the transmission oil temperature according to the outdoor air temperature, or the engine oil temperature according to the outdoor air temperature reaches a first flap closing temperature, and blocks another active air flap among the plurality of active air flaps when the coolant temperature according to the outdoor air temperature, the inverter temperature of the drive motor according to the outdoor air temperature, the inverter temperature of the starter-generator according to the outdoor air temperature, the temperature of the low DC converter according to the outdoor air temperature, the transmission oil temperature according to the outdoor air temperature, or the engine oil temperature according to the outdoor air temperature reaches a second flap closing temperature.

The first flap opening temperature, the second flap opening temperature, the first flap closing temperature, and the second flap closing temperature may decrease as the outdoor air temperature increases.

The second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature.

The first flap opening temperature, the second flap opening temperature, the first flap closing temperature, and the second flap closing temperature may reflect the high-speed correction temperature according to the vehicle speed, and the high-load correction temperature according to the load condition of the engine to be determined.

The controller may open one active air flap among the plurality of active air flaps when the refrigerant pressure according to the outdoor air temperature reaches a first flap opening pressure, open another active air flap among the plurality of active air flaps when the refrigerant pressure according to the outdoor air temperature reaches a second flap opening pressure, block one active air flap among the plurality of active air flaps when the refrigerant pressure according to the outdoor air temperature reaches a first flap closing pressure, and block another active air flap among the plurality of active air flaps when the refrigerant pressure according to the outdoor air temperature reaches a second flap closing pressure.

The first flap opening pressure, the second flap opening pressure, the first flap closing pressure, and the second flap closing pressure may decrease as the outdoor air temperature increases.

The second flap opening pressure may be higher than the first flap opening pressure, the second flap closing pressure may be lower than the first flap closing pressure, the first flap opening pressure may be higher than the first flap closing pressure, and the second flap opening pressure may be higher than the second flap closing pressure.

The first flap opening pressure, the second flap opening pressure, the first flap closing pressure, and the second flap closing pressure may be determined by reflecting a high-speed correction pressure according to a vehicle speed.

The controller may open all of the plurality of active air flaps when the operation mode of the cooling fan is in a high-speed mode.

The high-speed mode may be satisfied if the coolant temperature is above a predetermined temperature.

The controller may open one active air flap of the plurality of active air flaps when the intake temperature according to the outdoor air temperature reaches a first flap opening temperature, open another active air flap among the plurality of active air flaps when the intake temperature according to the outdoor air temperature reaches a second flap opening temperature, block one active air flap among the plurality of active air flaps when the intake temperature according to the outdoor air temperature reaches a first flap closing temperature, and block another active air flap among the plurality of active air flaps when the intake temperature according to the outdoor air temperature reaches a second flap closing temperature.

The driving mode may include an electric vehicle (EV) mode and a hybrid electric vehicle (HEV) mode, the first flap opening temperature in the EV mode may be higher than the first flap opening temperature in the HEV mode, the second flap opening temperature in the EV mode may be higher than the second flap opening temperature in the HEV mode, the first flap closing temperature in the EV mode may be a same as the first flap closing temperature in the HEV mode, and the second flap closing temperature in the EV mode may be the same as the second flap closing temperature in the HEV mode.

According to the hybrid vehicle including the active air flap and the control method thereof according to various exemplary embodiments of the present disclosure as described above, by controlling the opening and closing of a plurality of active air flaps according to the heat source provided inside the engine compartment, the aerodynamic performance of the vehicle may be improved, and thus the fuel efficiency of the vehicle may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a chart showing an open condition of an active air flap by a coolant temperature depending on an outdoor air temperature according to various exemplary embodiments of the present disclosure.

FIG. 6 is a diagram showing an open condition of an active air flap by a first inverter temperature of a drive motor depending on an outdoor air temperature according to various exemplary embodiments of the present disclosure.

FIG. 7 is a chart showing an open condition of an active air flap by a second inverter temperature of a starter-generator depending on an outdoor air temperature according to various exemplary embodiments of the present disclosure.

FIG. 8 is a chart showing an open condition of an active air flap by the transmission oil temperature depending on an outdoor air temperature according to various exemplary embodiments of the present disclosure.

FIG. 9 is a chart showing an open condition of an active air flap by an engine oil temperature depending on an outdoor air temperature according to various exemplary embodiments of the present disclosure.

FIG. 10 is a chart showing an open condition of an active air flap by an engine oil temperature depending on an outdoor air temperature according to various exemplary embodiments of the present disclosure.

FIG. 11 and FIG. 12 are charts showing an open condition of an active air flap by a refrigerant pressure depend on an outdoor air temperature according to various exemplary embodiments of the present disclosure.

FIG. 13 is a chart showing an open condition of an active air flap by an intake temperature depending on an outdoor air temperature for each driving mode according to various exemplary embodiments of the present disclosure.

Figure 1:
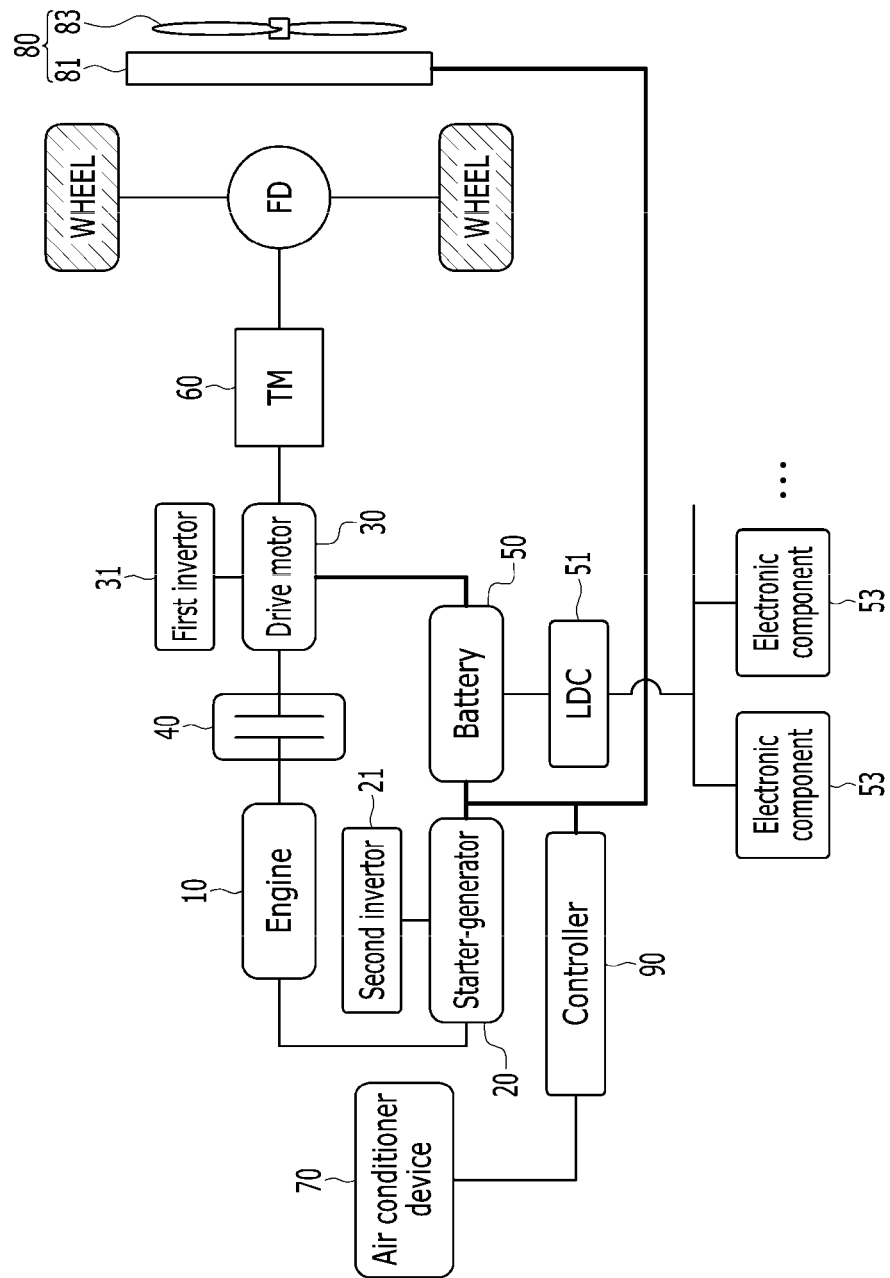
FIG. 1 is a schematic view showing a configuration of a hybrid vehicle according to various exemplary embodiments of the present disclosure.

It may be understood that the appended drawings are not necessarily to scale, presenting a somewhat simplified representation of various features illustrative of the basic principles of the present disclosure. The predetermined design features of the present invention as included herein, including, for example, predetermined dimensions, orientations, locations, and shapes will be determined in portion by the intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present invention.

Drawings and description are to be regarded as illustrative in nature and not restrictive, and like reference numerals designate like elements throughout the specification.

Also, in the drawings, sizes and thicknesses of components are arbitrarily shown for description purposes, so the present invention is not limited to the illustrations of the drawings and thicknesses are exaggerated to clearly express various portions and regions.

Hereinafter, a hybrid vehicle including an active air flap according to various exemplary embodiments of the present disclosure is described in detail with reference to appended drawings.

FIG. 1 is a schematic view showing a configuration of a hybrid vehicle according to various exemplary embodiments of the present disclosure.

As shown in FIG. 1, the hybrid vehicle according to various exemplary embodiments of the present disclosure may include an engine 10, a starter-generator 20, a drive motor 30, a clutch 40, a battery 50, an air conditioner device 70, and a controller 90.

The engine 10 generates power required for travelling of the vehicle by combusting fuel.

The drive motor 30 generates power required for travelling of the vehicle from power charged in the battery 50, and is selectively operated as a generator to generate electrical energy. The drive motor 30 is operated by use of the electrical energy charged in the battery 50, and the electrical energy generated in the drive motor 30 is charged in the battery 50.

The drive motor 30 is electrically connected to the first inverter 31, and when a control signal is applied from the controller 90 to the first inverter 31, DC power of the battery 50 is converted into AC power through the first inverter 31 and applied to the drive motor 30.

The hybrid starter and generator (HSG) 20 starts the engine 10, and is optionally operated as a generator in the state where the engine 10 is started to generate electrical energy. The electrical energy generated through the HSG 20 is charged in the battery 50.

The starter-generator 20 is electrically connected to the second inverter 21, and when a control signal is applied from the controller 90 to the second inverter 21, the DC power of the battery 50 is converted into AC power through the second inverter 21 and applied to the starter-generator 20.

A clutch 40 is provided between the engine 10 and the drive motor 30.

Depending on the coupling of the clutch 40, the hybrid vehicle may be driven in an Electric Vehicle (EV) mode or a Hybrid Electric Vehicle (HEV) mode. The EV mode is a mode in which the vehicle runs only with the driving torque of the drive motor 30, and the HEV mode is a mode in which the vehicle runs with the driving torque of the drive motor 30 and the engine 10.

Power output from the engine 10 and the drive motor 30 is transmitted to a driving wheel provided in the vehicle. In the instant case, a transmission 60 is provided between the clutch 40 and the driving wheel. A transmission gear is provided inside the transmission 60, so that power output from the engine 10 and the drive motor 30 may be changed according to a transmission gear stage.

The air conditioner device 70 is for cooling the interior of interior of the vehicle, in a process of circulating the refrigerant discharged by the operation of the compressor through a condenser, a receiver dryer, an expansion valve, and an evaporator again to the compressor, may cool the interior of interior of the vehicle by heat-exchange by the evaporator or heat the internal by inflowing the coolant to the heater to be heat-exchanged.

In a front-end module 100 of the vehicle, a cooling module 80 including a radiator 81 and a cooling fan 83 for cooling the coolant of the engine 10 of a high temperature is disposed, and the coolant flowing through the radiator 81 is cooled through heat-exchange with external air.

A low direct current converter (LDC) 51 is electrically connected to the battery 50, and the low DC converter 51 converts the low voltage DC output from the battery 50 into a DC current corresponding to the operating voltage of an electronic component 53 provided inside the vehicle or an engine compartment and outputs it.

The electronic component 53 provided inside the engine compartment may include an electric turbocharger, a radiator 81, a water pump, and the like.

In an exemplary embodiment of the present invention, a parallel type of Transmission mounted electric device (TMED) hybrid vehicle in which the clutch 40 is interposed between the transmission 60 and the drive motor 30 is described as an example. However, the scope of the present invention is not limited thereto, and may be applied to a series-type hybrid vehicle that operates the drive motor by converting mechanical power generated from the engine into electric power through a generator; and a power divergent hybrid vehicle that uses a planetary gear to split the power of the engine and the power of the drive motor of course.

Figure 2:
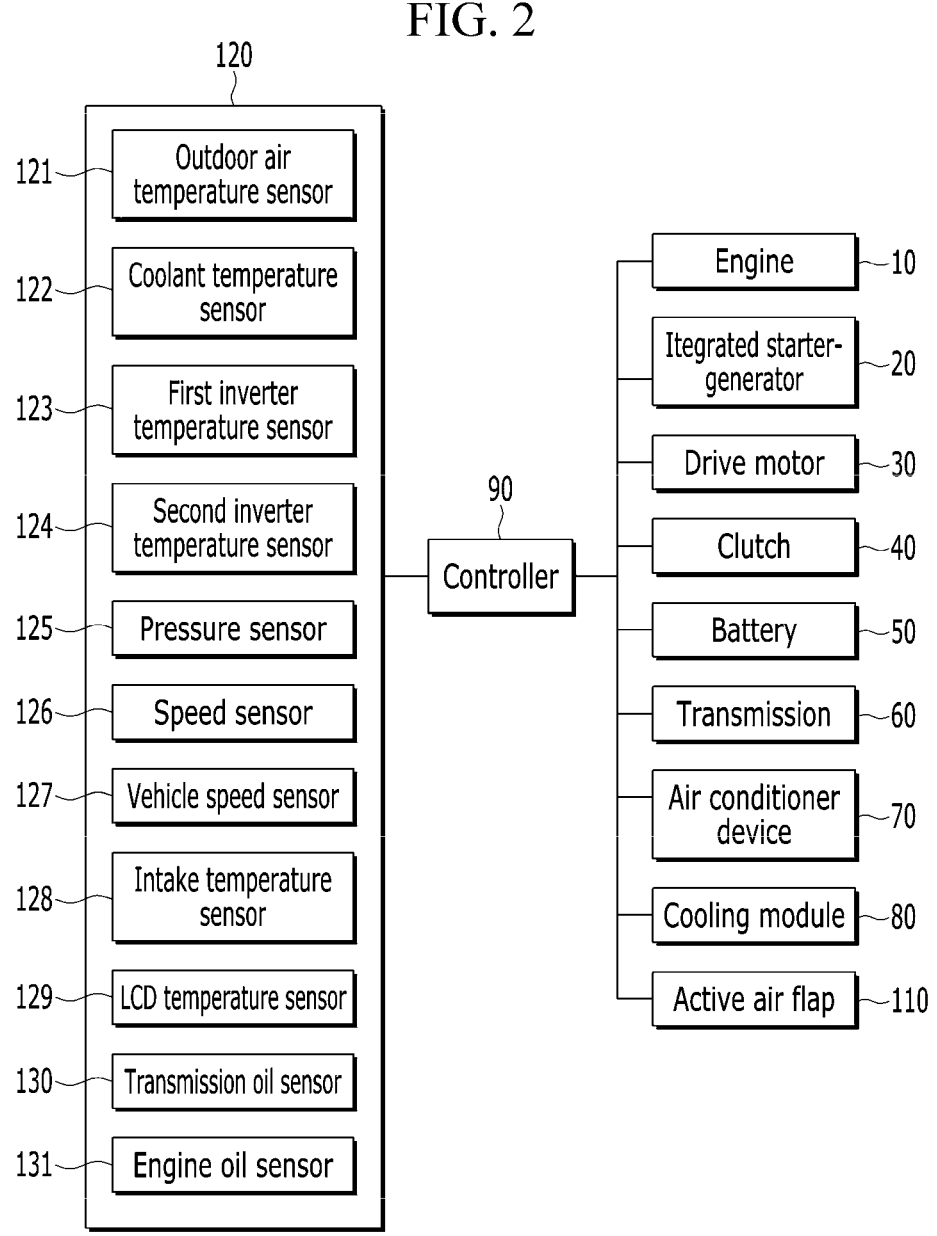
FIG. 2 is a block diagram showing a configuration of a hybrid vehicle including an active air flap according to various exemplary embodiments of the present disclosure.
Figure 3:
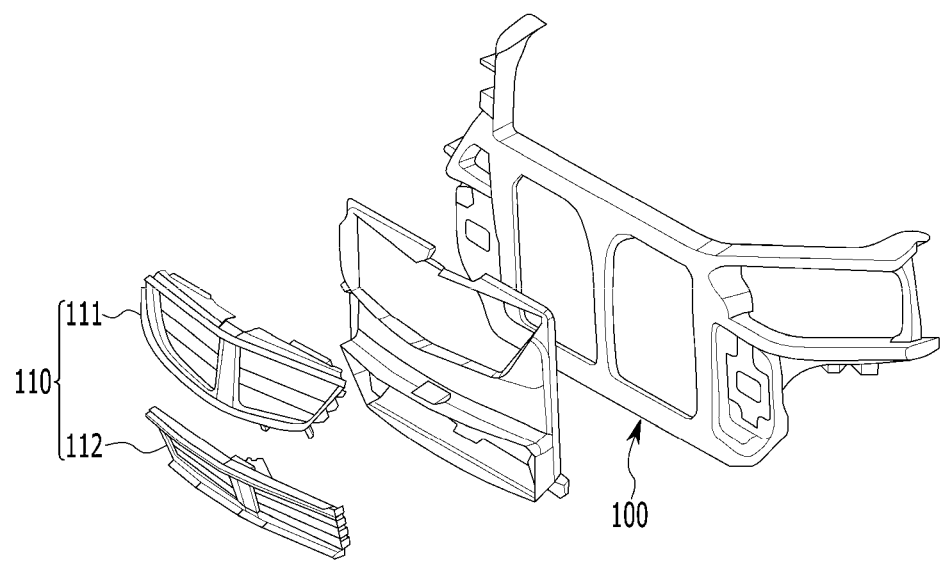
FIG. 3 is a perspective view showing a configuration of an active air flap according to various exemplary embodiments of the present disclosure.

FIG. 2 is a block diagram showing a configuration of a hybrid vehicle including an active air flap 110 according to various exemplary embodiments of the present disclosure.

As shown in FIG. 2, the hybrid vehicle including an active air flap 110 according to various exemplary embodiments of the present disclosure may include a plurality of active air flaps 110, a driving information sensing unit 120 that detects driving information, and a controller 90 for controlling opening and closing of a plurality of active air flaps 110 based on the driving information detected from the driving information sensing unit 120.

The active air flap 110 is provided on the top portion and bottom portion of the front-end module 100 of the vehicle, respectively, and each active air flap 110 may include flaps that may be selectively opened or closed. In an exemplary embodiment of the present invention, it is described that two active air flaps 110 (e.g., the first active air flap 111 provided in the upper portion of the front-end module 100 and the second active air flap 112 provided in the lower portion of the front-end module 100)) are provided in the vehicle as an exemplary embodiment of the present disclosure, but the scope of the present invention is not limited thereto, and two or more active air flaps 110 may be provided in the vehicle.

The driving information sensing unit 120 senses the driving information including an outdoor air temperature, a coolant temperature, a temperature of the first inverter 21 of the drive motor 30, a temperature of the second inverter 22 of the starter-generator 20, a temperature of the low DC converter 51, a transmission oil temperature, an engine oil temperature, a refrigerant pressure, a speed of the cooling fan 83, a vehicle speed, an intake temperature, and the detected driving information is transmitted to the controller 90.

The driving information sensing unit 120 may include an outdoor air temperature sensor 121 for sensing the outdoor air temperature, a coolant temperature sensor 122 for sensing the coolant temperature, a first inverter temperature sensor 123 for sensing the first inverter temperature of the drive motor 30, a second inverter temperature sensor 124 for sensing the temperature of the second inverter of the starter-generator 20, a pressure sensor 125 for sensing the refrigerant pressure, a speed sensor 126 for sensing the speed of the cooling fan 83, a vehicle speed sensor 127 for sensing the vehicle speed, an intake temperature sensor 128 for sensing the intake temperature, an LDC temperature sensor 129 for sensing the temperature of the low DC converter 51, a transmission oil sensor 130 for sensing the transmission oil temperature, and an engine oil sensor 131 for sensing the engine oil temperature.

The controller 90 may control the opening and closing of a plurality of active air flaps 110 based on the coolant temperature according to the outdoor air temperature, the inverter temperature of the drive motor 30 according to the outdoor air temperature, the inverter temperature of the starter-generator 20 according to the outdoor air temperature, the temperature of the low DC converter 51 according to the outdoor air temperature, the transmission oil temperature according to the outdoor air temperature, or the engine oil temperature according to the outdoor air temperature, may control the opening and closing of a plurality of active air flaps 110 based on the refrigerant pressure according to the outdoor air temperature, may control the opening and closing of a plurality of active air flaps 110 based on the operation mode of the cooling fan 83, or may control the opening and closing of a plurality of active air flaps 110 based on the intake temperature according to the outdoor air temperature for each of driving modes of the vehicle.

The controller 90 may be implemented by one or more processors operated by a predetermined program, in which the predetermined program is set to perform steps of the control method of the hybrid vehicle including the active air flap 110 according to various exemplary embodiments of the present disclosure.

Hereinafter, an operation of the hybrid vehicle including the active air flap 110 according to various exemplary embodiments of the present disclosure as described above is described in detail with reference to the accompanying drawings.

Figure 4:
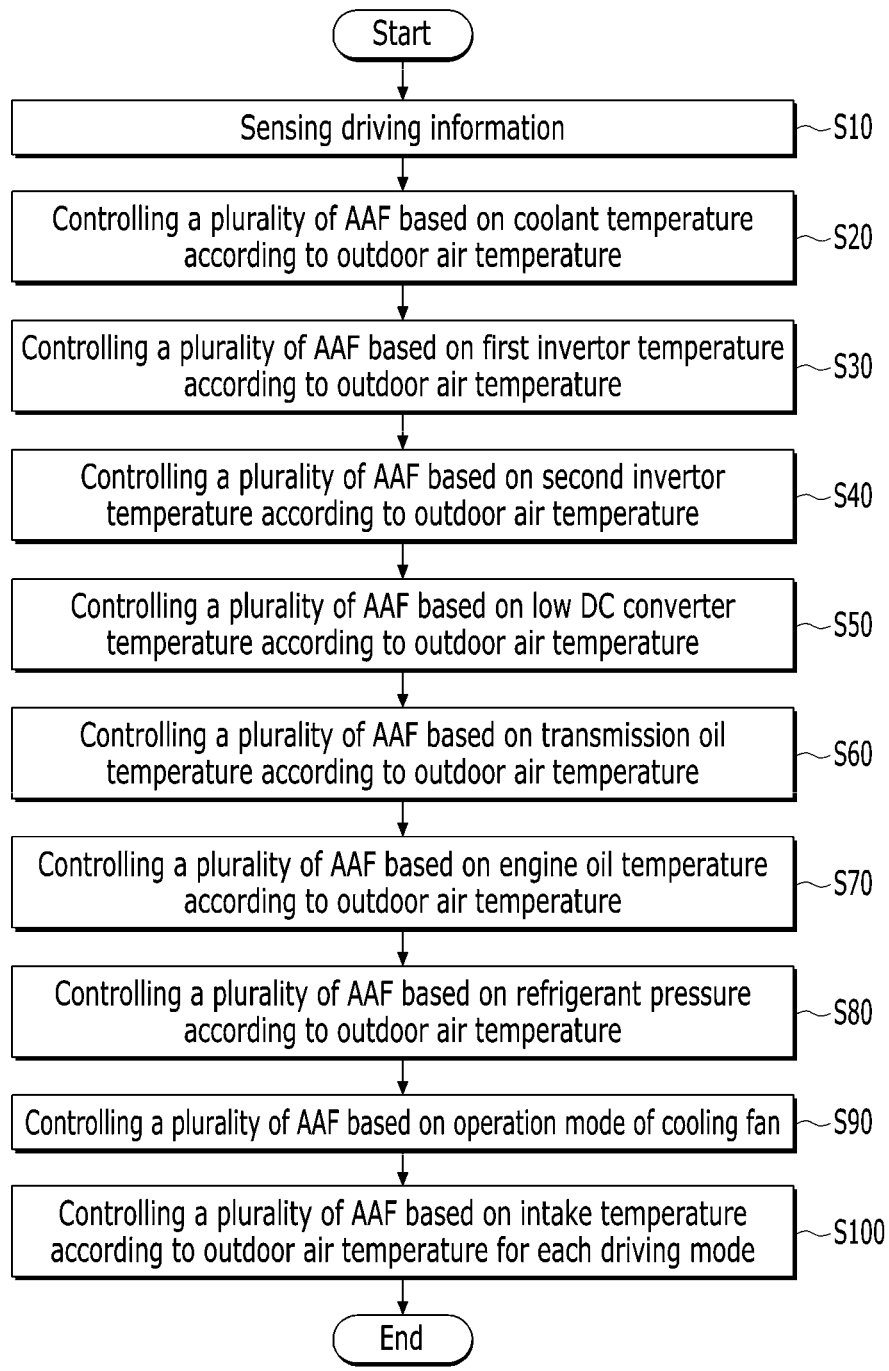
FIG. 4 is a flowchart showing a control method of an active air flap according to various exemplary embodiments of the present disclosure.

FIG. 4 is a flowchart showing a control method of the active air flap 110 according to various exemplary embodiments of the present disclosure.

Referring to FIG. 4, the driving information sensing unit 120 senses the driving information including the outdoor air temperature, the coolant temperature, the temperature of the first inverter of the drive motor 30, the temperature of the second inverter of the starter-generator 20, the engine oil temperature, the refrigerant pressure, the speed of the cooling fan 83, the vehicle speed, and the intake temperature, and the driving information detected from the driving information sensing unit 120 is transmitted to the controller 90 (S10).

[Coolant Temperature Depend on Outdoor Air Temperature]

The controller 90 controls the opening and closing of a plurality of active air flaps 110 based on the coolant temperature according to the outdoor air temperature S20.

When the coolant temperature according to the outdoor air temperature reaches the first flap opening temperature, the controller 90 opens the active air flap 110 (e.g., a first active air flap 111) of any one of a plurality of active air flaps 110. When the coolant temperature according to the outdoor air temperature reaches the second flap opening temperature, the controller 90 opens another active air flap 110 (e.g., a second active air flap 112) among a plurality of active air flaps 110. When the coolant temperature according to the outdoor air temperature reaches the first flap closing temperature, the controller 90 closes any one of a plurality of active air flaps 110 (e.g., the first active air flap 111). Also, when the coolant temperature according to the outdoor air temperature reaches the second flap closing temperature, the controller 90 closes the other active air flap 110 (e.g., the second active air flap 112) among a plurality of active air flaps 110.

At this time, the first flap opening temperature, the second flap opening temperature, the first flap closing temperature, and the second flap closing temperature may decrease as the outdoor air temperature increases. Also, the second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature (referring to FIG. 5).

The controller 90 may reflect the high-speed correction temperature according to the vehicle speed and the high-load correction temperature according to the load condition of the engine 10 to the first flap opening temperature, the second flap opening temperature, the first flap closing temperature, and the second flap closing temperature to determine a first flap opening temperature, a second flap opening temperature, a first flap closing temperature, and a second flap closing temperature.

For example, if the vehicle speed is greater than or equal to the first predetermined speed (e.g., 80 kph), the corrected first flap opening temperature, the corrected second flap opening temperature, the corrected first flap closing temperature, and the corrected second flap closing temperature may be determined by adding the high-speed correction temperature (e.g., 2 degrees Celsius) to the first flap opening temperature, the second flap opening temperature, the first flap closing temperature, and the second flap closing temperature. Also, if the vehicle speed is higher than the second predetermined speed (e.g., 100 kph), the corrected first flap opening temperature, the corrected second flap opening temperature, the corrected first flap closing temperature, and the corrected second flap closing temperature may be determined by adding the high-speed correction temperature (e.g., 4 degrees Celsius) to the first flap opening temperature, the second flap opening temperature, the first flap closing temperature, and the second flap closing temperature.

That is, only when the vehicle speed is equal to or greater than the predetermined speed may the first flap opening temperature, the second flap opening temperature, the first flap closing temperature, and the second flap closing temperature be determined by reflecting the high-speed correction temperature and the high-load correction temperature. In other words, the high-speed correction temperature and the high-load correction temperature is not reflected in the low-speed mode where the vehicle speed is slower than the predetermined speed.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the coolant temperature is relatively high.

Also, when the operation region of the engine 10 is the high load region, the high-load correction temperature (e.g., −10 degrees Celsius) may be subtracted from the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature. When the operation region of engine 10 is a high load region, relatively high heat is generated in the engine 10. Therefore, by applying the high-load correction temperature, the active air flap 110 may be opened or closed in the state that the coolant temperature is relatively low.

FIG. 5 is a chart showing an open condition of an active air flap 110 by a coolant temperature according to an outdoor air temperature according to various exemplary embodiments of the present disclosure.

Referring to FIG. 5, when the outdoor air temperature is 38 degrees Celsius, if the coolant temperature reaches A degrees (e.g., 100 degrees) Celsius, the controller 90 opens the first active air flap 111. When the outdoor air temperature is 38° C., if the coolant temperature reaches A' (e.g., 105° C.) ° C., the controller 90 opens the second active air flap 112. That is, if the coolant temperature reaches A' (e.g., 95 degrees Celsius) degrees, both the first active air flap 111 and the second active air flap 112 are opened.

Afterwards, when the outdoor air temperature is 38 degrees Celsius, if the coolant temperature reaches A degrees Celsius, the first active air flap 111 is shut off. Also, when the outdoor air temperature is 38 degrees Celsius, if the coolant temperature reaches A" degrees Celsius, the second active air flap 112 is shut off. That is, when the coolant temperature is A" degrees Celsius or less, all active air flaps 110 are shut off.

[First Inverter Temperature of Drive Motor 30 According to Outdoor Air Temperature]

The controller 90 controls the opening and closing of a plurality of active air flaps 110 based on the first inverter temperature of the drive motor 30 according to the outdoor air temperature (S30).

When the first inverter temperature of the drive motor 30 according to the outdoor air temperature reaches the first flap opening temperature, the controller 90 opens any one active air flap 110 (e.g., the first active air flap 111) of a plurality of active air flaps 110. When the first inverter temperature of the drive motor 30 according to the outdoor air temperature reaches the second flap opening temperature, the controller 90 opens another active air flap 110 (e.g., the second active air flap 112) among a plurality of active air flaps 110. When the first inverter temperature of the drive motor 30 according to the outdoor air temperature reaches the first flap closing temperature, the controller 90 blocks any one active air flap 110 (e.g., the first active air flap 111) of a plurality of active air flaps 110. Also, when the first inverter temperature of the drive motor 30 according to the outdoor air temperature reaches the second flap closing temperature, the controller 90 blocks another active air flap 110 (e.g., the second active air flap 112) among a plurality of active air flaps 110.

At this time, the first flap opening temperature, the second flap opening temperature, the first flap closing temperature, and the second flap closing temperature may decrease as the outdoor air temperature increases. Also, the second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature (referring to FIG. 6).

The controller 90 may reflect the high-speed correction temperature according to the vehicle speed and the high-load correction temperature according to the load condition of the engine 10 to the first flap opening temperature, the second flap opening temperature, the first flap closing temperature, and the second flap closing temperature to determine the first flap opening temperature, the second flap opening temperature, the first flap closing temperature, and the second flap closing temperature.

For example, if the vehicle speed is greater than or equal to the first predetermined speed (e.g., 80 kph), the high-speed correction temperature (e.g., 2 degrees Celsius) may be added to the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature. Also, if the vehicle speed is greater than the second predetermined speed (e.g., 100 kph), the high-speed correction temperature (e.g., 4 degrees Celsius) may be added to the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the first inverter temperature of the drive motor 30 is relatively high.

Also, when the operation region of engine 10 is the high-load region, the first flap opening temperature, the second flap opening temperature, the first flap closing temperature, and the second flap closing temperature may be determined by subtracting the high-load correction temperature (e.g., −10 degrees Celsius). When the operation region of engine 10 is the high-load region, relatively high heat is generated in the engine 10. Therefore, by applying the high-load correction temperature, the active air flap 110 may be opened or closed while the first inverter temperature of the drive motor 30 is relatively low.

FIG. 6 is a diagram showing an open condition of an active air flap 10 by a first inverter temperature of a drive motor 30 according to an outdoor air temperature according to various exemplary embodiments of the present disclosure.

Referring to FIG. 6, when the outdoor air temperature is 38 degrees Celsius, the first inverter temperature of the drive motor 30 reaches A degrees Celsius (e.g., 100 degrees), the controller 90 opens the first active air flap 111. At the outdoor air temperature of 38 degrees Celsius, if the first inverter temperature of the drive motor 30 reaches A' degrees Celsius (e.g., 105 degrees), the controller 90 opens the second active air flap 112. That is, when the first inverter temperature of the drive motor 30 reaches A' degrees Celsius, both the first active air flap 111 and the second active air flap 112 are opened.

Next, at the outdoor air temperature of 38 degrees Celsius, if the first inverter temperature of the drive motor 30 reaches A degrees Celsius (e.g., 100 degrees), the first active air flap 111 is blocked. Also, at the outdoor air temperature of 38 degrees Celsius, if the first inverter temperature of the drive motor 30 reaches A" degrees Celsius (e.g., 95 degrees), the second active air flap 112 is blocked. That is, at the first inverter temperature of the drive motor 30 of A" degrees Celsius or less, all active air flaps 110 are blocked.

[Second Inverter Temperature of Starter-Generator 20 According to Outdoor Air Temperature]

The controller 90 controls the opening and closing of a plurality of active air flaps 110 based on the second inverter temperature of the starter-generator 20 according to the outdoor air temperature S40.

When the second inverter temperature of the starter-generator 20 according to the outdoor air temperature reaches the first flap opening temperature, the controller 90 opens any one active air flap 110 of a plurality of active air flaps 110 (e.g., the first active air flap 111). When the second inverter temperature of the starter-generator 20 according to the outdoor air temperature reaches the second flap opening temperature, the controller 90 opens another active air flap 110 among a plurality of active air flaps 110 (e.g., the second active air flap 112). When the second inverter temperature of the starter-generator 20 according to the outdoor air temperature reaches the first flap closing temperature, the controller 90 blocks any one active air flap 110 of a plurality of active air flaps 110 (e.g., the first active air flap 111). Also, when the second inverter temperature of the starter-generator 20 according to the outdoor air temperature reaches the second flap closing temperature, the controller 90 blocks another active air flap 110 of a plurality of active air flaps 110 (e.g., the second active air flap 112).

At this time, the first flap opening temperature, the second flap opening temperature, the first flap closing temperature, and the second flap closing temperature may decrease as the outdoor air temperature increases. Also, the second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature (referring to FIG. 7).

The controller 90 may reflect the high-speed correction temperature according to the vehicle speed and the high-load correction temperature according to the load condition of the engine 10 to the first flap opening temperature, the second flap opening temperature, the first flap closing temperature, and the second flap closing temperature to determine the first flap opening temperature, the second flap opening temperature, the first flap closing temperature, and the second flap closing temperature.

For example, if the vehicle speed is greater than the first predetermined speed (e.g., 80 kph), by adding the high-speed correction temperature (e.g., 2 degrees Celsius) to the first flap opening temperature, the second flap opening temperature, the first flap closing temperature, and the second flap closing temperature, the corrected first flap opening temperature, the corrected second flap opening temperature, the corrected first flap closing temperature, and the corrected second flap closing temperature may be determined. Also, if the vehicle speed is greater than the second predetermined speed (e.g., 100 kph), by adding the high-speed correction temperature (e.g., 4 degrees Celsius) to the first flap opening temperature, the second flap opening temperature, the first flap closing temperature, and the second flap closing temperature, the corrected first flap opening temperature, the corrected second flap opening temperature, the corrected first flap closing temperature, and the corrected second flap closing temperature may be determined.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the second inverter temperature of the starter-generator 20 is relatively high.

Also, the operation region of the engine 10 is the high-load region, the first flap opening temperature, the second flap opening temperature, the first flap closing temperature, and the second flap closing temperature may be determined by subtracting the high-load correction temperature (e.g., −10 degrees Celsius). When the operation region of engine 10 is the high-load region, relatively high heat is generated in the engine 10. Therefore, by applying the high-load correction temperature, the active air flap 110 may be opened or closed in the state that the second inverter temperature of the starter-generator 20 is relatively low.

FIG. 7 is a chart showing an open condition of an active air flap 10 by a second inverter temperature of a starter-generator 20 depending on an outdoor air temperature according to various exemplary embodiments of the present disclosure.

Referring to FIG. 7, when the outdoor air temperature is 38 degrees Celsius, if the second inverter temperature of the starter-generator 20 reaches A degrees Celsius (e.g., 100 degrees), the controller 90 opens the first active air flap 111. At the outdoor air temperature of 38 degrees Celsius, if the second inverter temperature of the starter-generator 20 reaches A' degrees Celsius (e.g., 105 degrees), the controller 90 opens the second active air flap 112. That is, when the second inverter temperature of the starter-generator 20 reaches A' degrees Celsius, both the first active air flap 111 and the second active air flap 112 are opened.

After, at the outdoor air temperature of 38 degrees Celsius, if the second inverter temperature of the starter-generator 20 reaches A degrees Celsius, the first active air flap 111 is blocked. Also, at the outdoor air temperature of 38 degrees Celsius, if the second inverter temperature of the starter-generator 20 reaches A" degrees Celsius (e.g., 95 degrees), the second active air flap 112 is blocked. That is, when the second inverter temperature of the starter-generator 20 is below A" degrees Celsius, all active air flaps 110 are blocked.

[Temperature of Low DC Converter According to Outdoor Air Temperature]

The controller 90 controls the opening and closing of a plurality of active air flaps 110 based on the temperature of the low DC converter 51 according to the outdoor air temperature (S50).

When the temperature of the low DC converter 51 according to the outdoor air temperature reaches the first flap opening temperature, the controller 90 controls any one active air flap 110 (e.g., the first active air flap 111) of a plurality of active air flaps 110. When the temperature of the low DC converter 51 according to the outdoor air temperature reaches the second flap opening temperature, the controller 90 opens another active air flap 110 (e.g., the second active air flap 112) among a plurality of active air flaps 110. The controller 90 blocks any one active air flap 110 (e.g., the first active air flap 111) of a plurality of active air flaps 110 when the temperature of the low DC converter 51 according to the outdoor air temperature reaches the first flap closing temperature. Also, when the temperature of the low DC converter 51 according to the outdoor air temperature reaches the second flap closing temperature, the controller 90 blocks another active air flap 110 (e.g., the second active air flap 112) among a plurality of active air flaps 110.

At this time, the first flap opening temperature, the second flap opening temperature, the first flap closing temperature, and the second flap closing temperature may decrease as the outdoor air temperature increases. Also, the second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature (referring to FIG. 8).

The controller 90 may determine the first flap opening temperature, the second flap opening temperature, the first flap closing temperature, and the second flap closing temperature by reflecting the high-speed correction temperature according to the vehicle speed and the high-load correction temperature according to the load condition of the engine 10 to the first flap opening temperature, the second flap opening temperature, the first flap closing temperature, and the second flap closing temperature.

For example, if the vehicle speed is greater than or equal to the first predetermined speed (e.g., 80 kph), the high-speed correction temperature (e.g., 2 degrees Celsius) may be added to the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature. Also, if the vehicle speed is greater than the second predetermined speed (e.g., 100 kph), the high-speed correction temperature (e.g., 4 degrees Celsius) may be added to the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the temperature of the low DC converter 51 is relatively high.

Also, when the operation region of the engine 10 is the high-load region, the first flap opening temperature, the second flap opening temperature, the first flap closing temperature, and the second flap closing temperature may be determined by subtracting the high-load correction temperature (e.g., −10 degrees Celsius). When the operation region of engine 10 is the high-load region, relatively high heat is generated in the engine 10. Therefore, by applying the high-load correction temperature, the active air flap 110 may be opened or closed in the state that the temperature of the low DC converter 51 is relatively low.

FIG. 8 is a diagram showing an open condition of an active air flap by a temperature of a low DC converter 51 according to the outdoor air temperature according to various exemplary embodiments of the present disclosure.

Referring to FIG. 8, when the outdoor air temperature is 38 degrees Celsius, if the temperature of the low DC converter 51 reaches A degrees Celsius (e.g., 100 degrees), the controller 90 opens the first active air flap 111. At the outdoor air temperature of 38 degrees Celsius, when the temperature of the low DC converter 51 reaches A' degrees Celsius (e.g., 105 degrees), the controller 90 opens the second active air flap 112. That is, when the temperature of the low DC converter 51 reaches A' degrees Celsius, both the first active air flap 111 and the second active air flap 112 are opened.

Afterwards, when the outdoor air temperature is 38 degrees Celsius and the temperature of the low DC converter 51 reaches A degrees Celsius, the first active air flap 111 is blocked. And when the outdoor air temperature is 38 degrees Celsius and the temperature of the low DC converter 51 reaches A" degrees Celsius (e.g., 95 degrees), the second active air flap 112 is blocked. That is, when the temperature of the low DC converter 51 is below Celsius A" degrees, all active air flaps 110 are blocked.

[Transmission Oil Temperature According to Outdoor Air Temperature]

The controller 90 controls the opening and closing of a plurality of active air flaps 110 based on the transmission oil temperature according to the outdoor air temperature (S60).

When the transmission oil temperature according to the outdoor air temperature reaches the first flap opening temperature, the controller 90 opens any one active air flap 110 (e.g., the first active air flap 111) of a plurality of active air flaps 110. When the transmission oil temperature according to the outdoor air temperature reaches the second flap opening temperature, the controller 90 opens another active air flap 110 (e.g., the second active air flap 112) among a plurality of active air flaps 110. The controller 90 blocks any one of a plurality of active air flaps 110 (e.g., the first active air flap 111) when the transmission oil temperature according to the outdoor air temperature reaches the first flap closing temperature. Also, when the transmission oil temperature according to the outdoor air temperature reaches the second flap closing temperature, the controller 90 blocks another active air flap 110 (e.g., the second active air flap 112) among a plurality of active air flaps 110.

At this time, the first flap opening temperature, the second flap opening temperature, the first flap closing temperature, and the second flap closing temperature may decrease as the outdoor air temperature increases. Also, the second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature (referring to FIG. 8).

The controller 90 may reflect the high-speed correction temperature according to the vehicle speed and the high-load correction temperature according to the load condition of the engine 10 to the first flap opening temperature, the second flap opening temperature, the first flap closing temperature, and the second flap closing temperature to determine the first flap opening temperature, the second flap opening temperature, the first flap closing temperature, and the second flap closing temperature.

For example, if the vehicle speed is greater than the first predetermined speed (e.g., 80 kph), by adding the high-speed correction temperature (e.g., 2 degrees Celsius) to the first flap opening temperature, the second flap opening temperature, the first flap closing temperature, and the second flap closing temperature, the corrected first flap opening temperature, the corrected second flap opening temperature, the corrected first flap closing temperature, and the corrected second flap closing temperature may be determined. Also, if the vehicle speed is greater than the second predetermined speed (e.g., 100 kph), the high-speed correction temperature (e.g., 4 degrees Celsius) may be added to the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the transmission oil temperature is relatively high.

Also, when the operation region of engine 10 is the high-load region, the first flap opening temperature, the second flap opening temperature, the first flap closing temperature, and the second flap closing temperature may be determined by subtracting the high-load correction temperature (e.g., −10 degrees Celsius). When the operation region of the engine 10 is the high-load region, relatively high heat is generated in the engine 10. Therefore, by applying the high-load correction temperature, the active air flap 110 may be opened or closed while the engine oil temperature is relatively low.

FIG. 9 is a chart showing an open condition of an active air flap by a transmission oil temperature according to an outdoor air temperature according to various exemplary embodiments of the present disclosure.

Referring to FIG. 9, if the outdoor air temperature is 38 degrees Celsius, the controller 90 opens the first active air flap 111 if the transmission oil temperature reaches A degrees Celsius (e.g., 100 degrees). At the outdoor air temperature of 38 degrees Celsius, if the transmission oil temperature reaches A' degrees Celsius (e.g., 105 degrees), the controller 90 opens the second active air flap 112. That is, when the transmission oil temperature reaches A' degrees Celsius, both the first active air flap 111 and the second active air flap 112 are opened.

As such, when the outdoor air temperature is 38 degrees Celsius and the transmission oil temperature reaches A degrees Celsius, the first active air flap 111 is blocked. And when the outdoor air temperature is 38 degrees Celsius and the transmission oil temperature reaches A" degrees Celsius (e.g., 95 degrees), the second active air flap 112 is blocked. That is, when the transmission oil temperature is below A" degrees Celsius, all active air flaps 110 are blocked.

[Engine Oil Temperature According to Outdoor Air Temperature]

The controller 90 controls the opening and closing of a plurality of active air flaps 110 based on the engine oil temperature according to the outdoor air temperature (S70).

When the engine oil temperature according to the outdoor air temperature reaches the first flap opening temperature, the controller 90 opens any one of a plurality of active air flaps 110 (e.g., the first active air flap 111). When the engine oil temperature according to the outdoor air temperature reaches the second flap opening temperature, the controller 90 opens another active air flap 110 (e.g., the second active air flap 112) among a plurality of active air flaps 110. When the engine oil temperature according to the outdoor air temperature reaches the first flap closing temperature, the controller 90 blocks any one of a plurality of active air flaps 110 (e.g., the first active air flap 111). Also, when the engine oil temperature according to the outdoor air temperature reaches the second flap closing temperature, the controller 90 blocks another active air flap 110 (e.g., the second active air flap 112) among a plurality of active air flaps 110.

At this time, the first flap opening temperature, the second flap opening temperature, the first flap closing temperature, and the second flap closing temperature may decrease as the outdoor air temperature increases. Also, the second flap opening temperature may be higher than the first flap opening temperature, the second flap closing temperature may be lower than the first flap closing temperature, the first flap opening temperature may be the same as the first flap closing temperature, and the second flap opening temperature may be higher than the second flap closing temperature (referring to FIG. 8).

The controller 90 may reflect the high-speed correction temperature according to the vehicle speed and the high-load correction temperature according to the load condition of the engine 10 to the first flap opening temperature, the second flap opening temperature, the first flap closing temperature, and the second flap closing temperature to determine the first flap opening temperature, the second flap opening temperature, the first flap closing temperature, and the second flap closing temperature.

For example, if the vehicle speed is greater than the first predetermined speed (e.g., 80 kph), by adding the high-speed correction temperature (e.g., 2 degrees Celsius) to the first flap opening temperature, the second flap opening temperature, the first flap closing temperature, and the second flap closing temperature, the corrected first flap opening temperature, the corrected second flap opening temperature, the corrected first flap closing temperature, and the corrected second flap closing temperature may be determined. Also, if the vehicle speed is greater than the second predetermined speed (e.g., 100 kph), the high-speed correction temperature (e.g., 4 degrees Celsius) may be added to the first flap opening temperature, the second flap opening temperature, the first flap closing temperature, and the second flap closing temperature to determine the corrected first flap opening temperature, the corrected second flap opening temperature, the corrected first flap closing temperature, and the corrected second flap closing temperature.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the engine oil temperature is relatively high.

Also, when the operation region of engine 10 is the high-load region, the first flap opening temperature, the second flap opening temperature, the first flap closing temperature, and the second flap closing temperature may be determined by subtracting the high-load correction temperature (e.g., −10 degrees Celsius). When the operation region of engine 10 is the high-load region, relatively high heat is generated in the engine 10. Therefore, by applying the high-load correction temperature, the active air flap 110 may be opened or closed in the state that the engine oil temperature is relatively low.

FIG. 10 is a chart showing an open condition of an active air flap by an engine oil temperature according to an outdoor air temperature according to various exemplary embodiments of the present disclosure.

Referring to FIG. 10, when the outdoor air temperature is 38 degrees Celsius, if the engine oil temperature reaches A degrees Celsius (e.g., 100 degrees), the controller 90 opens the first active air flap 111. When the outdoor air temperature is 38 degrees Celsius and the engine oil temperature reaches A" degrees Celsius (e.g., 105 degrees), the controller 90 opens the second active air flap 112. That is, when the engine oil temperature reaches A' degrees Celsius, both the first active air flap 111 and the second active air flap 112 are opened.

Afterwards, when the outdoor air temperature is 38 degrees Celsius and the engine oil temperature reaches A degrees Celsius, the first active air flap 111 is blocked. Also, when the outdoor air temperature is 38 degrees Celsius and the engine oil temperature reaches A" degrees Celsius (e.g., 95 degrees), the second active air flap 112 is blocked. That is, when the engine oil temperature is below A" degrees Celsius, all active air flaps 110 are blocked.

[Refrigerant Pressure According to Outdoor Air Temperature]

The controller 90 controls the opening and closing of a plurality of active air flaps 110 based on the refrigerant pressure of the air conditioner device 70 according to the outdoor air temperature (S80).

When the refrigerant pressure according to the outdoor air temperature reaches the first flap opening pressure, the controller 90 opens any one active air flap 110 (e.g., the first active air flap 111) of a plurality of active air flaps 110. When the refrigerant pressure according to the outdoor air temperature reaches the second flap opening pressure, the controller 90 opens another active air flap 110 (e.g., the second active air flap 112) of a plurality of active air flaps 110. The controller 90 blocks any one active air flap 110 (e.g., the first active air flap 111) of a plurality of active air flaps 110 when the refrigerant pressure according to the outdoor air temperature reaches the first flap closing pressure. Also, when the refrigerant pressure according to the outdoor air temperature reaches the second flap closing pressure, the controller 90 blocks another active air flap 110 (e.g., the second active air flap 112) of a plurality of active air flaps 110.

In the instant case, the first flap opening pressure, the second flap opening pressure, the first flap closing pressure, and the second flap closing pressure may decrease as the outdoor air temperature increases (referring to FIG. 11).

Optionally, the first flap opening pressure, the second flap opening pressure, the first flap closing pressure, and the second flap closing pressure may be each set to be equal below a reference outdoor air temperature X, and when exceeding the reference outdoor air temperature X. they may decrease as the outdoor air temperature increases (referring to FIG. 12).

The controller 90 may determine the first flap opening pressure, the second flap opening pressure, the first flap closing pressure, and the second flap closing pressure by reflecting the high-speed correction pressure according to the vehicle speed to the first flap opening pressure, the second flap opening pressure, the first flap closing pressure, and the second flap closing pressure.

For example, if the vehicle speed is greater than the first predetermined speed (e.g., 80 kph), the corrected first flap opening pressure, the corrected second flap opening pressure, the corrected first flap closing pressure, and the corrected second flap closing pressure may be determined by adding the first high-speed correction pressure (e.g., 20 psi) to the first flap opening pressure, the second flap opening pressure, the first flap closing pressure, and the second flap closing pressure. Also, if the vehicle speed is greater than or equal to the second predetermined speed (e.g., 100 kph), the corrected first flap opening pressure, the corrected second flap opening pressure, the corrected first flap closing pressure, and the corrected second flap closing pressure may be determined by adding the second high-speed correction pressure (e.g., 40 psi) to the first flap opening pressure, the second flap opening pressure, the first flap closing pressure, and the second flap closing pressure.

When the vehicle speed is high, the flow rate of the air inflowing from the outside thereof through the active air flap 110 into the engine compartment 10 is high. Therefore, by applying the high-speed correction temperature, the active air flap 110 may be opened or closed in the state that the coolant temperature is relatively high.

[Operation Mode of Cooling Fan 83]

The controller 90 controls the opening and closing of a plurality of active air flaps 110 based on the operation mode of the cooling fan 83 (S90).

When the operation mode of the cooling fan 83 is a high-speed mode, the controller 90 opens all of a plurality of active air flaps 110. If the temperature of the coolant is a predetermined temperature (e.g., 105 Celsius degrees or higher), the operation mode of the cooling fan 83 may enter the high-speed mode.

That is, when the cooling fan 83 operates at high speed, all active air flaps 110 may be opened to cool the radiator 81 by the operation of the cooling fan 83.

[Intake Temperature According to Outdoor Air Temperature by Driving Mode]

The controller 90 controls the opening and closing of a plurality of active air flaps 110 based on the intake temperature (the temperature of the intake inflowing to the engine 10) according to the outdoor air temperature for each driving mode of the vehicle (S100).

The driving mode of the vehicle may include an EV mode (electric vehicle mode) in which the vehicle travels only with the driving torque of the drive motor 30, and a hybrid electric vehicle (HEV) mode in which the vehicle travels with the driving torque of the drive motor 30 and the engine 10.

The controller 90 opens any one active air flap 110 (e.g., the first active air flap 111) of a plurality of active air flaps 110 when the intake temperature according to the outdoor air temperature reaches the first flap opening temperature. When the intake temperature according to the outdoor air temperature reaches the second flap opening temperature, the controller 90 opens another active air flap 110 (e.g., the second active air flap 112) among a plurality of active air flaps 110. The controller 90 blocks any one of a plurality of active air flaps 110 (e.g., the first active air flap 111) when the intake temperature according to the outdoor air temperature reaches the first flap closing temperature. And when the intake temperature according to the outdoor air temperature reaches the second flap closing temperature, the controller 90 blocks another active air flap 110 (e.g., a second active air flap 112) of a plurality of active air flaps 110.

In the instant case, the first flap opening temperature in the EV mode may be higher than the first flap opening temperature in the HEV mode, the second flap opening temperature in the EV mode may be higher than the second flap opening temperature in the HEV mode, the first flap closing temperature in the EV mode may be the same as the first flap closing temperature in the HEV mode, and the second flap closing temperature in the EV mode may be the same as the second flap closing temperature in the HEV mode (referring to FIG. 13).

In FIG. 13, D is higher than C, F is higher than E, H and G are the same, and I and J are the same.

According to the hybrid vehicle according to various exemplary embodiments of the present disclosure as described above, by controlling the opening and closing of a plurality of active air flaps 110 according to the heat source provided inside the engine compartment, the aerodynamic performance of the vehicle may be improved, and thus, the fuel efficiency of the vehicle may be improved.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by a plurality of control devices, or an integrated single control device.

In an exemplary embodiment of the present invention, the control device may be implemented in a form of hardware or software, or may be implemented in a combination of hardware and software.

In addition, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A hybrid vehicle including an active air flap, the hybrid vehicle comprising:
   a plurality of active air flaps provided on a front-end module of the hybrid vehicle; and
   a controller configured for:
      controlling opening and closing of the plurality of active air flaps based on a coolant temperature according to an outdoor air temperature,
   wherein the controller is further configured for:
   opening one active air flap among the plurality of active air flaps when the coolant temperature according to the outdoor air temperature, reaches a first flap opening temperature;
   opening another active air flap among the plurality of active air flaps when the coolant temperature according to the outdoor air temperature, reaches a second flap opening temperature;
   blocking one active air flap among the plurality of active air flaps when the coolant temperature according to the outdoor air temperature reaches a first flap closing temperature; and
   blocking another active air flap among the plurality of active air flaps when the coolant temperature according to the outdoor air temperature, reaches a second flap closing temperature, wherein the first flap opening temperature, the second flap opening temperature, the first flap closing temperature, and the second flap closing temperature decrease as the outdoor air temperature increases, wherein the first flap opening temperature, the second flap opening temperature, the first flap closing temperature, and the second flap closing temperature reflect a high-speed correction temperature according to a vehicle speed, and a high-load correction temperature according to a load condition of an engine, wherein, only when the vehicle speed is equal to or greater than the predetermined speed, the first flap opening temperature, the second flap opening temperature, the first flap closing temperature, and the second flap closing temperature are determined by reflecting the high-speed correction temperature, and wherein, when the operation region of the engine is a high load region, the first flap opening temperature, the second flap opening temperature, the first flap closing temperature, and the second flap closing temperature are determined by applying the high-load correction temperature.

2. The hybrid vehicle of claim 1, wherein the second flap opening temperature is higher than the first flap opening temperature, wherein the second flap closing temperature is lower than the first flap closing temperature, wherein the first flap opening temperature is a same as the first flap closing temperature, and wherein the second flap opening temperature is higher than the second flap closing temperature.

3. A method of an active air flap in a vehicle, the method comprising:

controlling, by a controller, opening and closing of a plurality of active air flaps provided on a front-end module of the hybrid vehicle based on a coolant temperature according to an outdoor air temperature, wherein the controller is further configured for:

opening one active air flap among the plurality of active air flaps when the coolant temperature according to the outdoor air temperature reaches a first flap opening temperature, opening another active air flap among the plurality of active air flaps when the coolant temperature according to the outdoor air temperature reaches a second flap opening temperature, blocking one active air flap among the plurality of active air flaps when the coolant temperature according to the outdoor air temperature reaches a first flap closing temperature, and blocking another active air flap among the plurality of active air flaps when the coolant temperature according to the outdoor air temperature reaches a second flap closing temperature, wherein the second flap opening temperature is higher than the first flap opening temperature, the second flap closing temperature is lower than the first flap closing temperature, the first flap opening temperature is a same as the first flap closing temperature, and the second flap opening temperature is higher than the second flap closing temperature, wherein the first flap opening temperature, the second flap opening temperature, the first flap closing temperature, and the second flap closing temperature reflect a high-speed correction temperature according to a vehicle speed, and a high-load correction temperature according to a load condition of an engine, wherein, only when the vehicle speed is equal to or greater than the predetermined speed, the first flap opening temperature, the second flap opening temperature, the first flap closing temperature, and the second flap closing temperature are determined by reflecting the high-speed correction temperature, and wherein, when the operation region of the engine is a high load region, the first flap opening temperature, the second flap opening temperature, the first flap closing temperature, and the second flap closing temperature are determined by applying the high-load correction temperature.

* * * * *